US012506628B1

(12) United States Patent
Paiuk

(10) Patent No.: US 12,506,628 B1
(45) Date of Patent: Dec. 23, 2025

(54) BLOCKCHAIN FOR CONTACT CENTER ENGAGEMENT DATA

(71) Applicant: Zoom Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 161 days.

(21) Appl. No.: 18/462,509

(22) Filed: Sep. 7, 2023

(51) Int. Cl.
*H04L 9/00* (2022.01)
*G06F 21/62* (2013.01)
*H04L 9/32* (2006.01)

(52) U.S. Cl.
CPC ............ *H04L 9/50* (2022.05); *G06F 21/6245* (2013.01); *H04L 9/3247* (2013.01)

(58) Field of Classification Search
CPC . G06F 16/3326; G06F 16/3329; G06N 20/00; G06Q 2220/00; G06Q 20/3829; H04L 2209/56; H04L 63/0838; H04L 9/50
See application file for complete search history.

(56) References Cited

U.S. PATENT DOCUMENTS

2021/0135876 A1\* 5/2021 Adibi ................. G06Q 20/3829
2021/0303552 A1\* 9/2021 Pandey ................... G06F 21/64

OTHER PUBLICATIONS

Digital Signatures using RSA, https://faculty.uml.edu/klevasseur/math/RSA_Signatures/RSA_Signatures.pdf, Kenneth Levasseur, 2013, 4 pages.
Tech GDPR, GDPR's Right to be Forgotten in Blockchain: it's not black and white. https://techgdpr.com/blog/gdpr-right-to-be-forgotten-blockchain/, Silvan Jongerius, Aug. 13, 2019, 16 pages.
When Blockchain Meets the Right to be Forgotten: Technology Versus Law in the Healthcare Industry, http://www.myhealthmydata.eu/wp-content/uploads/2019/10/When_Blockchain_Meets_the_Right_to_be_Forgotten.pdf, Aurelie Bayle, Mirko Koscina, David Manset, Octavio Perez-Kempner, 2018, 5 pages.
Bitcoin: A Peere-to-Peere Electronic Cash System, https://bitcoin.org/bitcoin.pdf, Satoshi Nakamoto, retrieved from internet Sep. 2023, 9 pages.

\* cited by examiner

*Primary Examiner* — Olugbenga O Idowu
(74) *Attorney, Agent, or Firm* — Young Basile Hanlon & MacFarlane, P.C.

(57) ABSTRACT

A server of a contact center generates an engagement recording and engagement metadata associated with a contact center engagement. The engagement metadata identifies one or more user devices and one or more business servers. The server stores the engagement recording and the engagement metadata in a block of a private blockchain. The block includes a cryptographic hash of a previous block in the private blockchain, the engagement recording, and the engagement metadata. The server provides access to the block to the one or more user devices and the one or more business servers.

20 Claims, 9 Drawing Sheets

BLOCKCHAIN FOR CONTACT CENTER ENGAGEMENT DATA

FIELD

This disclosure relates the use of a blockchain for storing contact center engagement data. For example, a blockchain may include multiple blocks, with each block storing contact center engagement recordings and contact center engagement metadata.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
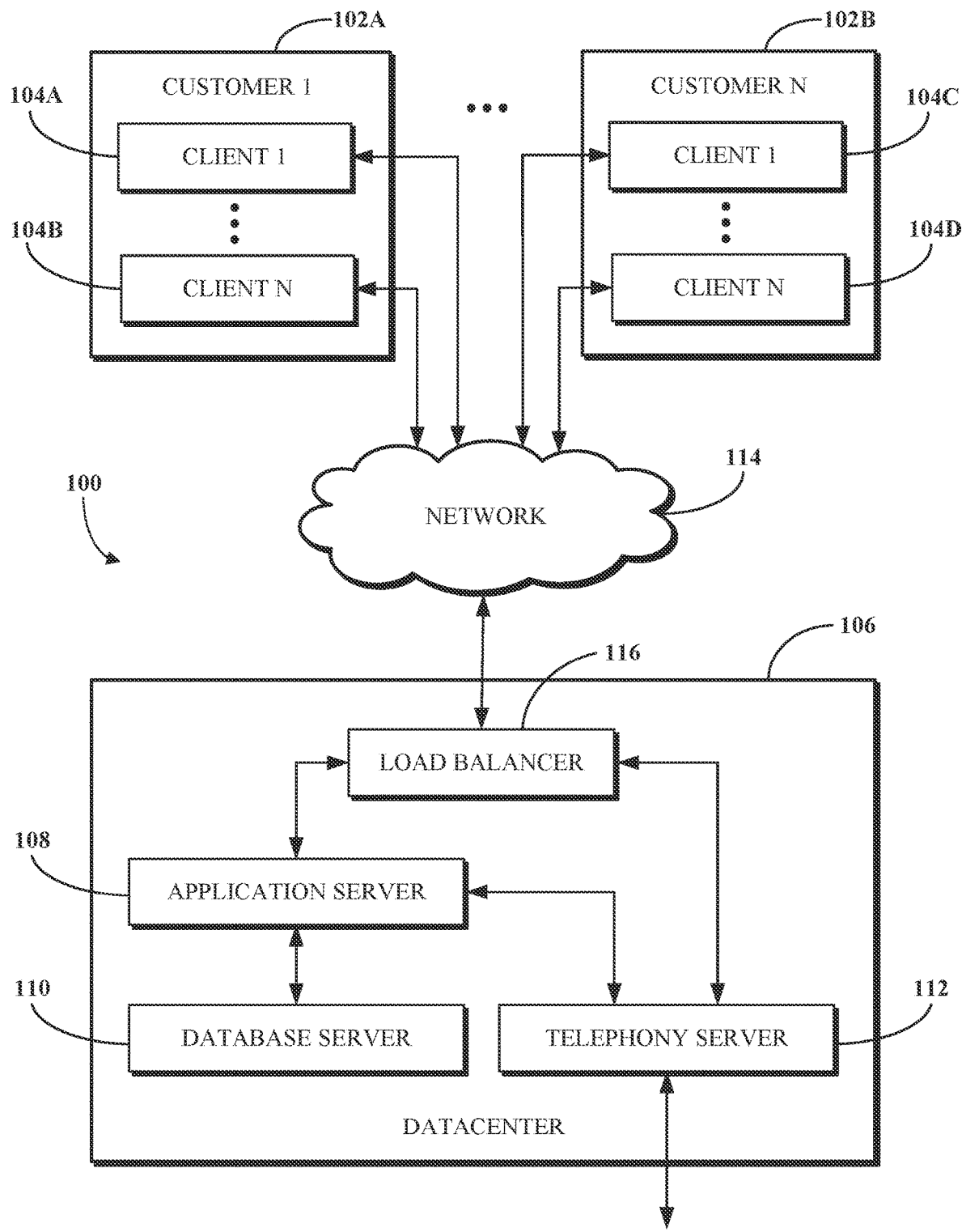
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform or a contact center as a service (CCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

A user may access a contact center to conduct a contact center engagement. The engagement may be recorded and the recording may be accessible to an entity operating the contact center. However, it may be desirable to provide access to the recording to other entities, such as the user. Furthermore, in some cases, there may be multiple businesses involved in an engagement. For example, a user may initiate a video call with an airline, and the airline might have the video call handled by a third party that provides customer service for the airline via the contact center. The multiple businesses and the user might all benefit from having access to the recording of the contact center engagement. One solution is to store the recording in a database, and provide access to the database to all interested parties. However, the interested parties would have to trust the party operating the database not to modify or delete the recording.

In some cases, the contact center engagement might involve or be related to a dispute between certain parties. For example, a user might access a contact center of an airline to request a change to a flight itinerary, and might use the recording as proof that the airline agreed to the change and proof of the fee they were charged for the change. If a third party handled the engagement on behalf of the airline, the airline and/or the third party might desire verification that the third party performed according to the service level agreement between the third party and the airline. Storing the recording in a database belonging to a single entity (e.g., the airline or the third party) might not be desirable because other entities might not trust the owner of the database not to modify or delete the data stored in the database, if such data is not advantageous to the owner. Furthermore, some industries (e.g., finance) may maintain (e.g., to comply with the law or best practices) accurate records of contact center engagements independent of whether there is a dispute.

Implementations of this disclosure address problems such as these by storing engagement recordings and engagement metadata in a private blockchain. The private blockchain is a distributed database or ledger that provides trust and verification that other solutions (e.g., the database solution described above) might not provide. For example, the private blockchain allows interested parties to verify that the data stored on the blockchain has not been tampered with since storage. Furthermore, the private nature of the blockchain ensures that other parties, who are not related to the issues discussed during the engagement, do not have access to the engagement. In some implementations, a server generates an engagement recording and engagement metadata during a contact center engagement. The server stores the engagement recording and the engagement metadata in a block of a private blockchain. The block includes a hash (e.g., a cryptographic hash) of a previous block in the private blockchain, the engagement recording, and the engagement metadata. The server provides access to the block to users and/or business servers associated with the engagement, while denying access to the block to other entities.

According to some implementations, a block of the private blockchain cannot be edited after the block is written to the private blockchain. According to other implementations, the block may be edited after the block is written to the private blockchain if consent for the edit is received from one or more computers (e.g., business servers or user devices) associated with the block. For example, the block may be digitally signed by the one or more computers, and any edit to the block would also need to be signed by the one or more computers. As a result, an entity using the private blockchain might be able to process user requests to delete or modify their stored data in accordance with legal mandates or best practices.

Some aspects may include one or more of the following features. Some implementations allow interested parties (e.g., users via user devices or businesses via business servers) to access the blockchain block and verify that it has been edited or deleted according to provided requests. Some implementations allow interested parties to verify that a recording has been completely deleted from the private blockchain when requested, for example, in order to comply with legal mandates or best practices related to privacy. In some implementations, interested parties can access the blockchain to verify the metadata about an engagement (e.g., at least one of a time duration of the engagement, a hold time duration, a franchise or an agent associated with the engagement, or agent notes for the engagement). Some implementations allow a user to verify that personally identifiable information was removed from the block. In other implementations, personally identifiable information may be retained on the block (e.g., so the user can prove that they participated in the engagement, and they were provided with certain information by the contact center agent).

To describe some implementations in greater detail, reference is first made to examples of hardware and software structures used to implement a blockchain for contact center engagement data. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UcaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UcaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UcaaS platform. For example, the application server 108 can implement all or a portion of a UcaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
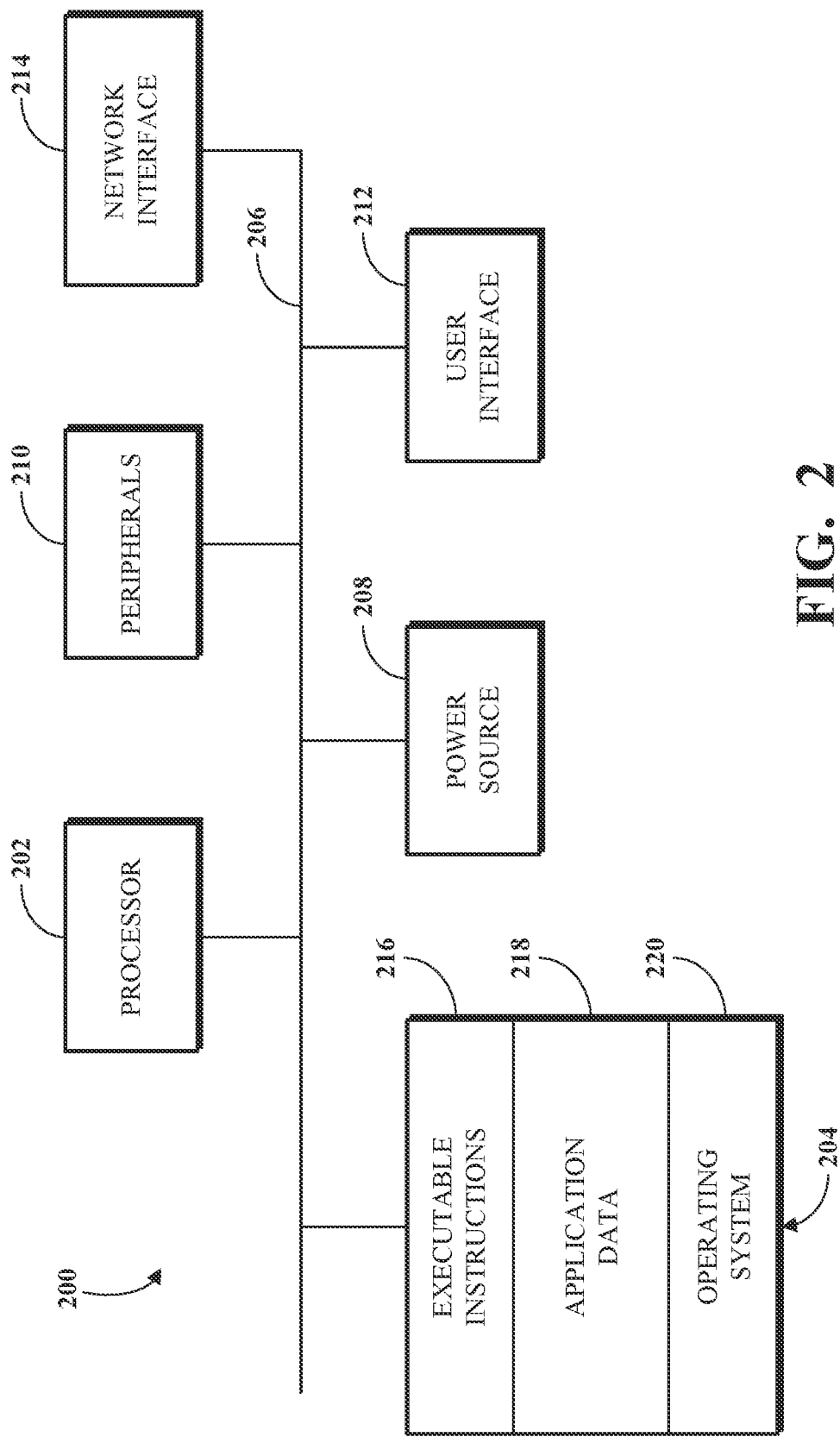
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
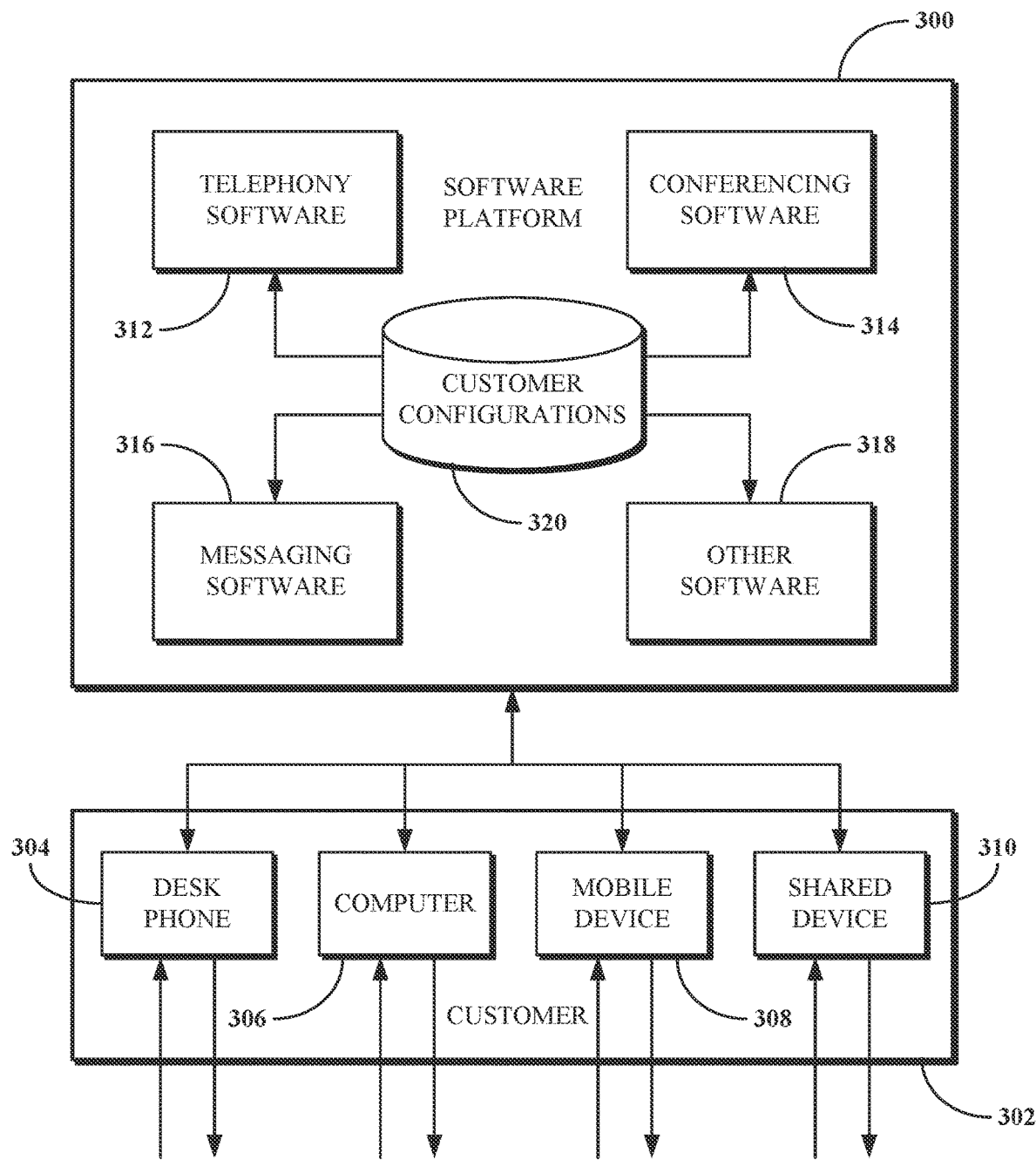
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UcaaS platform accessible by clients of a customer of a UcaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include contact center software, for example, software for a blockchain for contact center engagement data.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
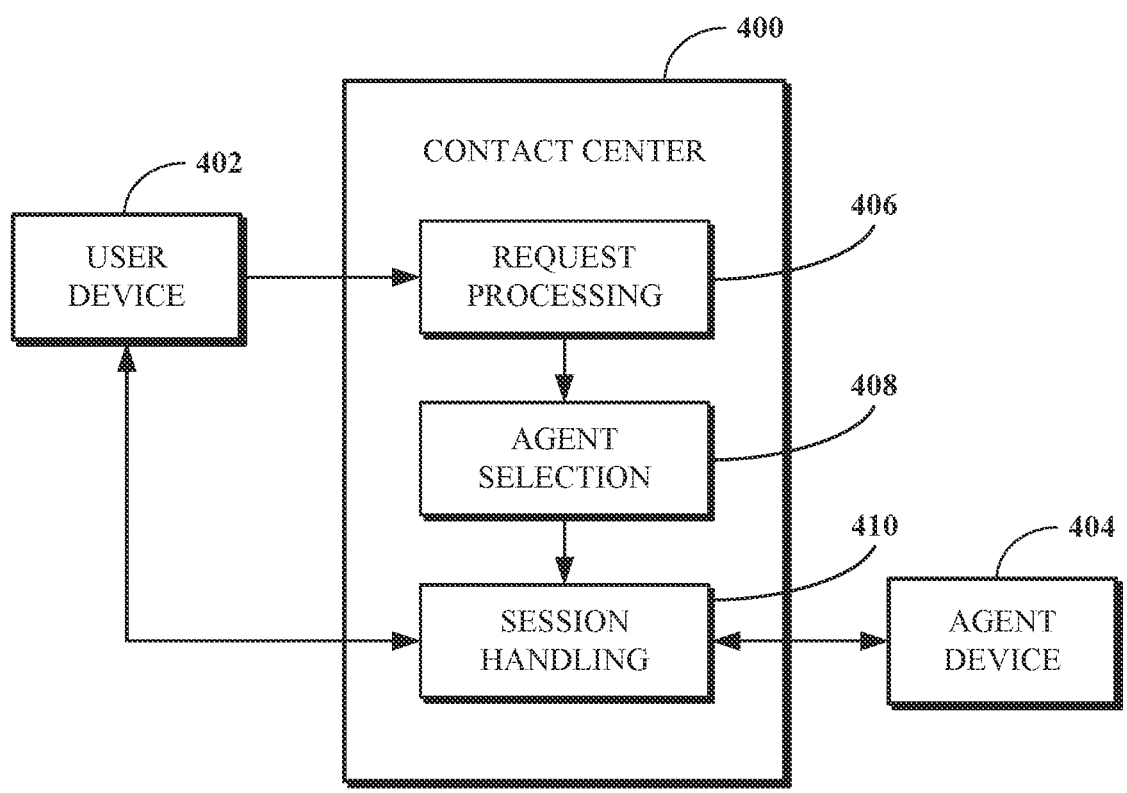
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a7 client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
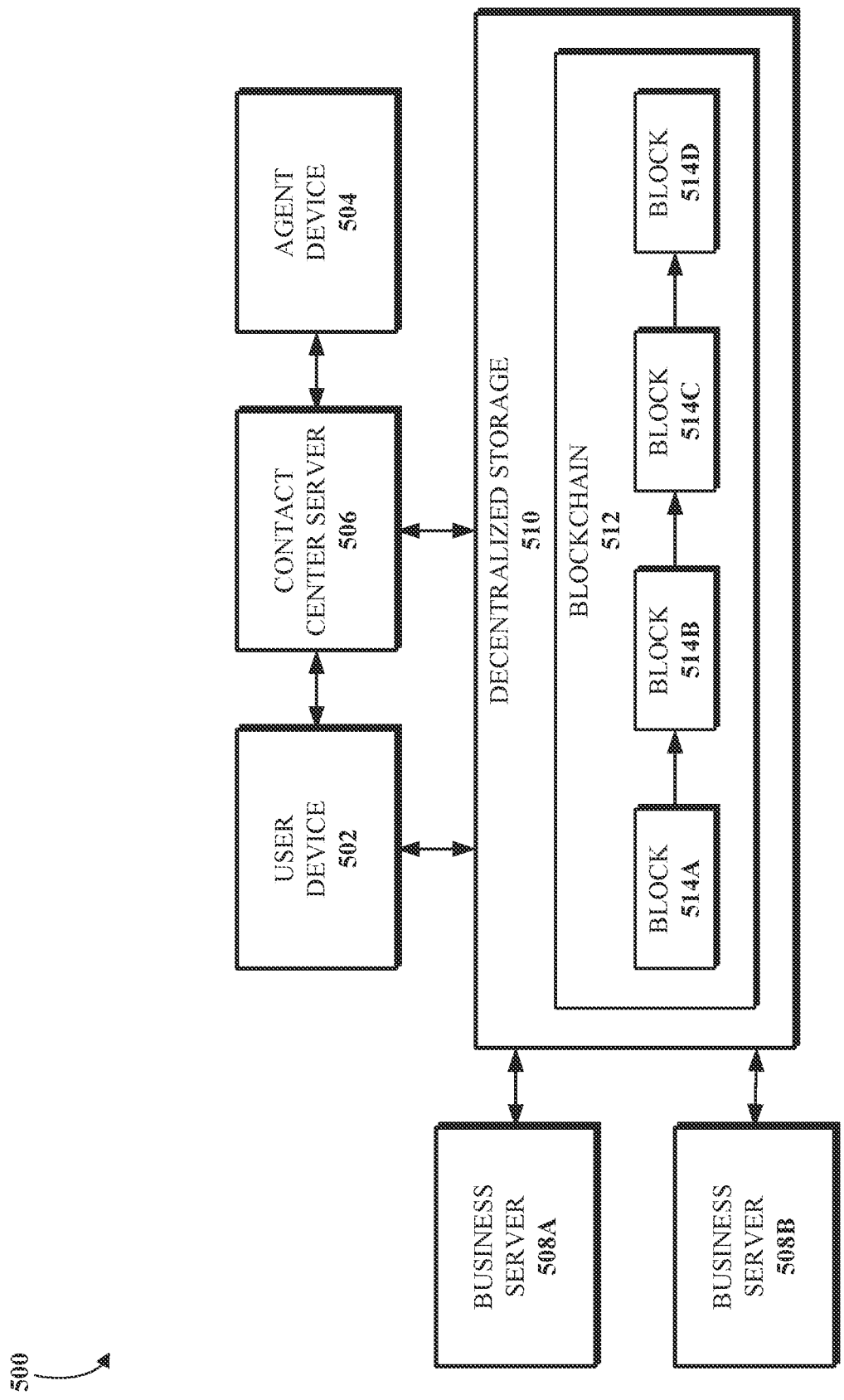
FIG. 5 is a block diagram of an example of a contact center system with decentralized storage.

FIG. 5 is a block diagram of an example of a contact center system 500 with decentralized storage. As shown, the system includes a user device 502, an agent device 504, a contact center server 506, business servers 508A, 508B, and decentralized storage 510. The user device 502 may correspond to the user device 402. The agent device 504 may correspond to the agent device 404. The contact center server 506 may perform one or more functionalities of the contact center 400. For example, the contact center server 506 may perform at least one of request processing software 406, agent selection software 408, or session handling software 410. The business servers 508A-B are associated with businesses (or other entities) that use the contact center to communicate with users of user devices (e.g., the user device 502) and sign data for secure storage in the decentralized storage 510. The business servers 508A-B may include at least one of a server of a business operating the contact center 400, a server of a customer service provision business, or a server of a business transacting with a user of the user device 502. The customer service provision business provides customer service via the contact center 400. The business transacting with the user communicates with the user via the contact center 400, for example, using the services of the customer service provision business.

The decentralized storage 510 distributes data across multiple nodes of a decentralized computer network. As a result, the data in the decentralized storage 510 may be accessible if one of the nodes is unavailable or not working, and the data in the decentralized storage may be difficult to modify, as modification might require notifying each of the multiple nodes that stores the modified data of the change. The decentralized storage 510 may be implemented using a decentralized storage solution, for example, at least one of IPFS (Inter-Planetary File System), Storj, Filecoin, Sia, or Arweave. As used herein, the phrase "decentralized storage" encompasses, among other things, a storage system in which data are distributed across multiple nodes, rather than being concentrated in a single location. As a result, there might be no single point of failure, and the storage system may be more resilient to attack or disruption.

As shown, the decentralized storage 510 includes a blockchain 512, which includes multiple blocks 514A-D (e.g., blocks 514A, 514B, 514C, 514D). The blockchain 512 may be a private blockchain that is permissioned, meaning that only authorized participants (e.g., the business servers 508A, 508B) may participate in a consensus process for adding or removing the blocks 514A-D. Each block 514A-D stores a recording of a contact center engagement, as well as metadata of the contact center engagement, and other information for including the block (e.g., one of the blocks 514A-D) in the blockchain 512. To ensure security of the blockchain 512, each block 514A-D includes a Merkle root, which is a mathematical function of other data in the block. The Merkle root may be digitally signed (e.g., using a mathematical function, for example, the RSA (Rivest-Shamir-Adleman) algorithm or the DSA (digital signature algorithm)) by one or more entities (e.g., one or more of the business servers 508A-B) to ensure that the block is not modified without the consent of the one or more entities. Each block 514A-D also includes a hash (e.g., a cryptographic hash) of a previous block in the blockchain 512. Each block 514A-D may also include a pointer to at least one of the previous block or a next block in the blockchain 512. An example of the block 514A-D of the blockchain 512 is described in conjunction with FIG. 6.

According to some implementations, a contact center engagement is conducted, via the contact center server 506, between the user device 502 and the agent device 504. The contact center engagement is associated with one or more businesses associated with the business servers 508A, 508B. For example, the contact center engagement may be associated with a product sold by a business of the business server 508A and may be handled by agents working for a business of the business server 508B. The contact center engagement is recorded by the contact center server 506. After the contact center engagement is completed, the engagement recording, along with engagement metadata is written to one of the blocks 514A-D of the blockchain 512. The engagement metadata identifies user devices (e.g., the user device 502) connected to the engagement, business servers (e.g., the business servers 508A-B) associated with the engagement, and, in some cases, other information about the engagement, such as an engagement duration, a hold time duration, an engagement start time, an engagement end time, an identifier of a contact center agent participating in the contact center engagement, an identifier of a contact center unit associated with the contact center engagement, or a summary of the contact center engagement. The one of the blocks 514A-D of the blockchain 512 including the recording is made accessible to the user device connected to the engagement and to devices accessing the one of the blocks 514A-514D via one of the business servers 508A-B associated with the engagement.

As illustrated, the contact center server 506 and the business servers 508A-B are distinct. In some cases, the contact center server 506 may be one of the business servers 508A-B. Furthermore, while two business servers 508A-B are illustrated, in some cases, there may be one, two, three or another number of business servers. Furthermore, while the blockchain 512 is illustrated as including four blocks 514A-D by example, the blockchain 512 may include other numbers of blocks.

Figure 6:
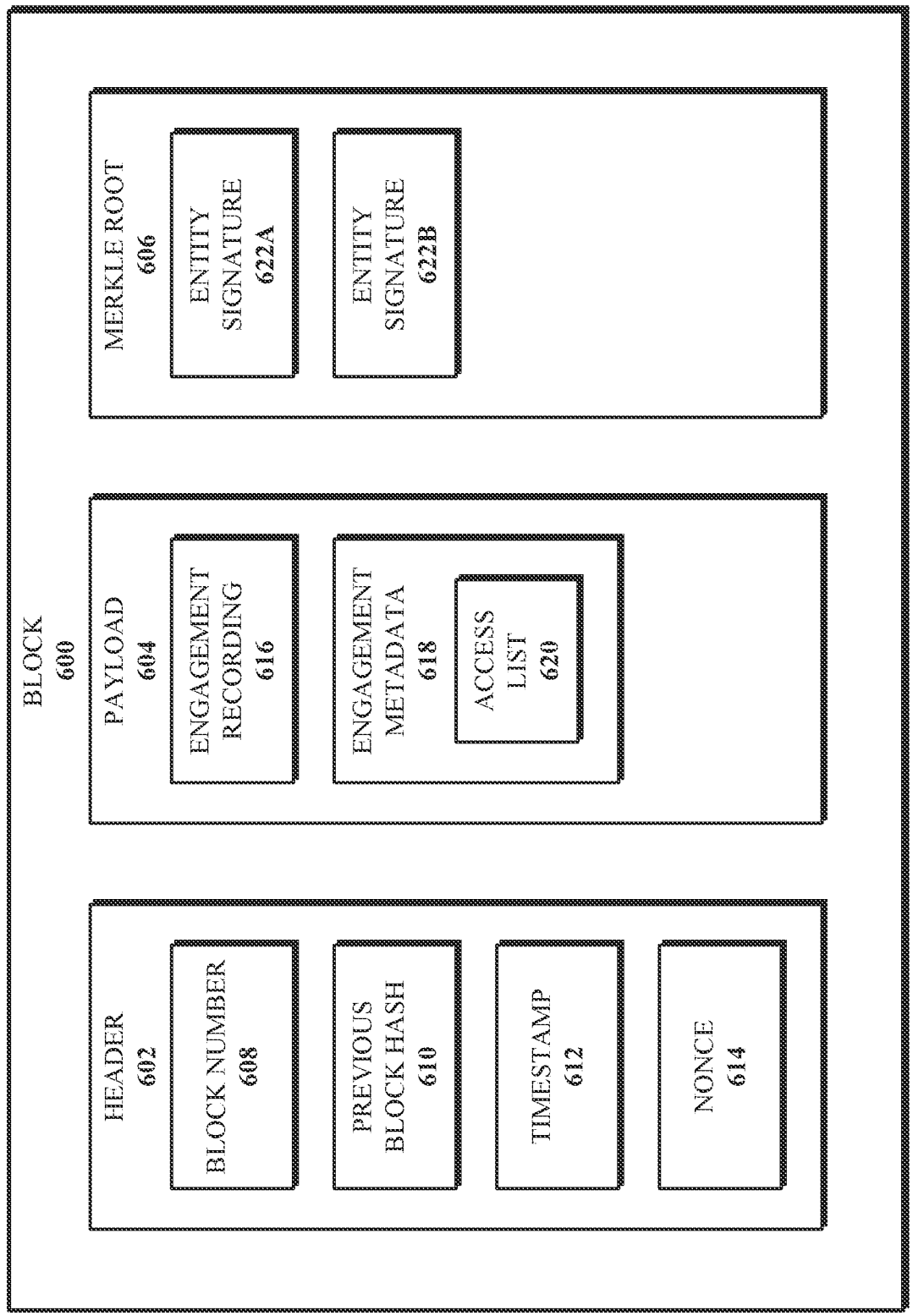
FIG. 6 is a block diagram of an example of a block of a blockchain.

FIG. 6 is a block diagram of an example of a block 600 of a blockchain (e.g., the blockchain 512). The block 600 may correspond to one of the blocks 514A-D. As shown, the block 600 includes a header 602, a payload 604, and a Merkle root 606.

The header 602 includes a block number 608, a previous block hash 610, a timestamp 612, and a nonce 614. The block number 608 identifies the block. In some implementations, the block number 608 may be replaced with a block identifier that is not a number. The previous block hash 610 corresponds to a hash function (e.g., a cryptographic hash function) of a previous block in the blockchain (or a hash of zero if the block 600 is the first block). As used herein, a hash function is a function that maps a data item of arbitrary size to a data item of fixed size. The output of a hash function is called a hash value, hash code, digest, or simply a hash. For example, a hash function may be "hash (x)=int (x) mod 1000." This hash function returns an integer between 0 and 999 regardless of the value of x. The timestamp 612 corresponds to a time when the block 600 was last modified. The nonce 614 is an arbitrary or pseudo-arbitrary number that is only used once. The nonce 614 may be used to compute the Merkle root 606, as described below.

The payload 604 includes an engagement recording 616 and engagement metadata 618. The engagement recording 616 includes at least one of an audio recording of a contact center engagement, a video recording of the contact center engagement, a transcript of speech in the contact center engagement or a transcript of typed messages in the contact center engagement. The engagement metadata 618 includes any metadata of the contact center engagement. As illustrated, the engagement metadata 618 includes an access list 620. In some cases, the engagement metadata 618 may include at least one of identifiers of one or more user devices in the contact center engagement, identifiers of one or more user accounts in the contact center engagement, identifiers one or more businesses (or other entities) associated with the contact center engagement, identifiers of one or more business servers (e.g., a subset of the business servers 508A-B) associated with the contact center engagement, an engagement duration, a hold time duration, an engagement start time, an engagement end time, an identifier of a contact center agent participating in the contact center engagement, an identifier of a contact center unit (e.g., a franchise or another subdivision of the contact center) associated with the contact center engagement, or a summary of the contact center engagement.

The access list 620 in the engagement metadata 618 includes a list (or other data structure) of accounts, devices, or servers that have read access (and, in some cases, also write access) to the block 600. For example, the access list 620 may identify at least one user account, user device, business server, or business entity that is granted read access to the block 600. For example, users and businesses associated with the contact center engagement may be granted read access to the block 600.

The Merkle root 606 is a single hash value that is computed based on all of the data in the header 602 and the payload 604. Verification that the header 602 and the payload 604 are valid and have not been impermissibly tampered with may be done based on the Merkle root 606. As illustrated, the Merkle root 606 includes entity signatures 622A-B (e.g., entity signature 622A and entity signature 622B). The entity signatures 622A-B indicate that the associated entities (e.g., at least one of the contact center server 506 or a subset of the business servers 508A-B) confirm the validity of the header 602 and the payload 604 of the block 600. The entity signatures 622A-B ensure that the header 602 and the payload 604 are not modified without the consent of the entities providing the entity signatures 622A-B.

Some implementations relate to the use of digital signatures (e.g., the entity signatures 622A-B). Various digital signature algorithms may be used with the disclosed technology. In some examples, RSA digital signatures are used. RSA digital signatures may be implemented using a public key of a machine (e.g., the contact center server 506 or a business server 508A-B) called e, a private key of the machine called d, and a nonce (e.g., the nonce 614) called n. The public key e is known to the public, while the private key d is known to the associated machine and not to other machines. For a value to be signed (e.g., the Merkle root 606) called m, the following functions are defined for each machine:

$f(m)=m^e$ mod n is the encryption function, which is public.

$g(m)=m^d$ mod n is the decryption function, which is private.

The functions $f$ and $g$ are defined such that $f(g(m))=g(f(m))=m$. To sign m, a machine computes $s=g(m)$, which is computed using the private key d and the nonce n. Other machines may verify the signature by computing $f(s)$, which should be equal to m and is computed using the public key e and the nonce n. A machine different from the signing machine does not know the function g and, therefore, cannot compute $s=g(m)$.

As shown in FIG. 6, the payload 604 includes the engagement recording 616 and the engagement metadata 618. In some cases, the payload 604 may include the engagement metadata 618 without the engagement recording 616. Whether to store the engagement recording 616 could be determined on a case-by-case basis. For example, a contact center that is a business process outsourcer may have customers that selectively decide whether they want their engagements to be recorded or not, such that some engagements would be saved to the blockchain 512 with the metadata 618 only or with the engagement metadata 618 and the engagement recording 616.

The engagement recording 616 could be an audio recording or a video recording. The engagement recording 616 may include a transcript if the engagement is transcribed from audio/video or if the engagement is conducted via email or messaging. In some cases, the engagement recording 616 includes other images or files shared during the engagement that could be saved to the blockchain. For example, a user accessing a contact center by text messages to receive support with a water softener system might include, within a message or as an attachment to a message, a photograph of the water softener (e.g., to show an error message displayed on a display unit). That photograph may be included in the engagement recording 616.

Figure 7:
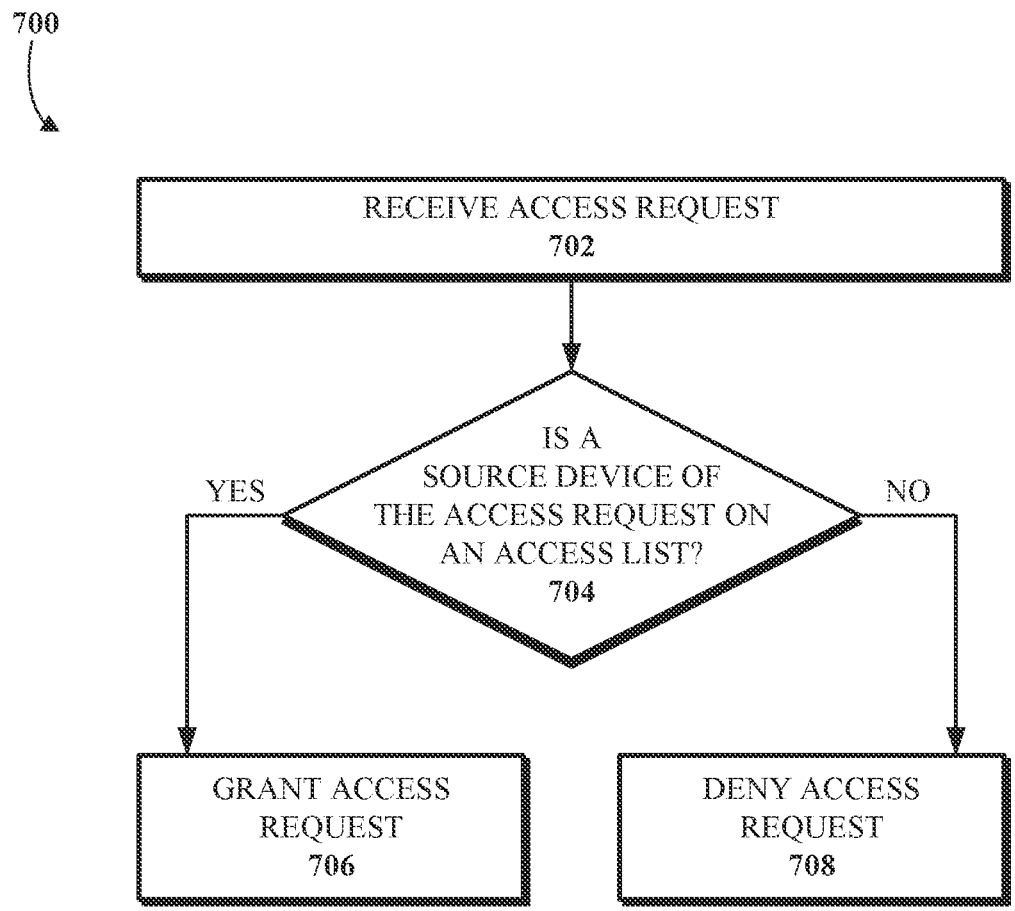
FIG. 7 is a flowchart of an example of a technique for processing an access request.
Figure 8:
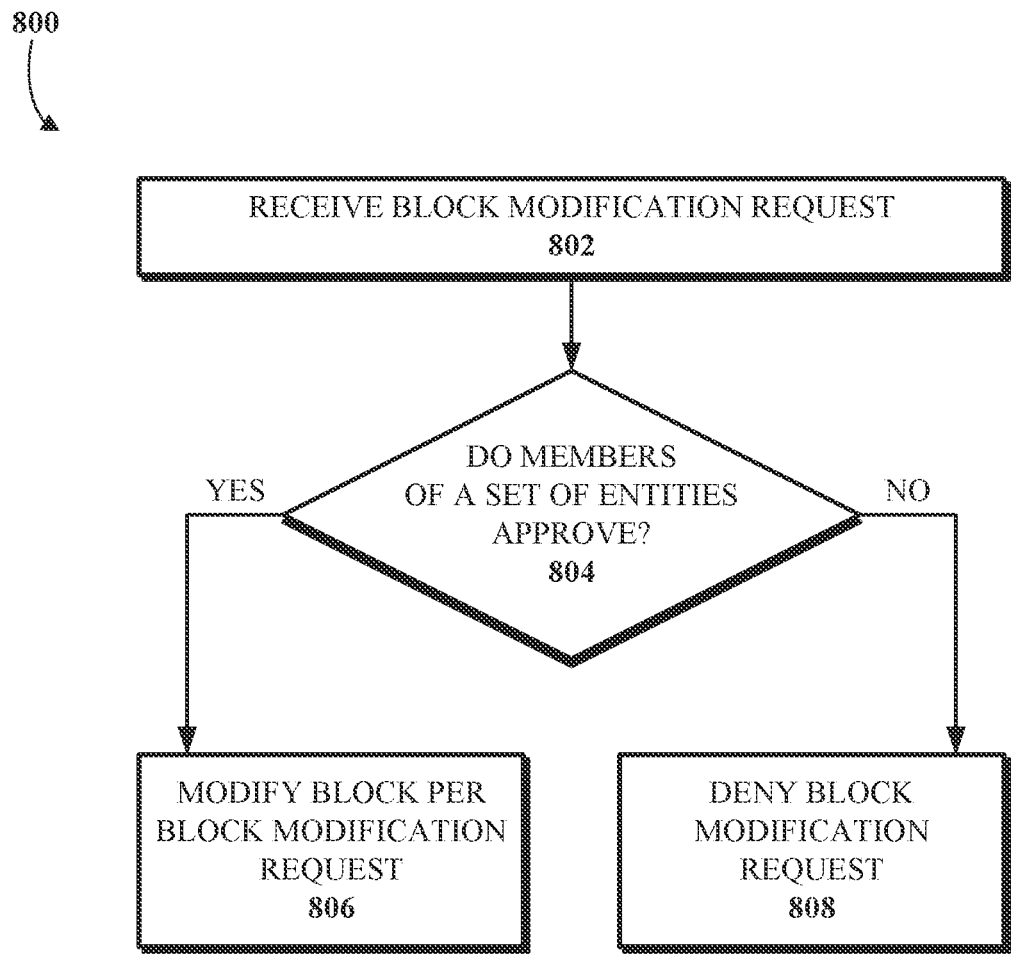
FIG. 8 is a flowchart of an example of a technique for processing a block modification request.
Figure 9:
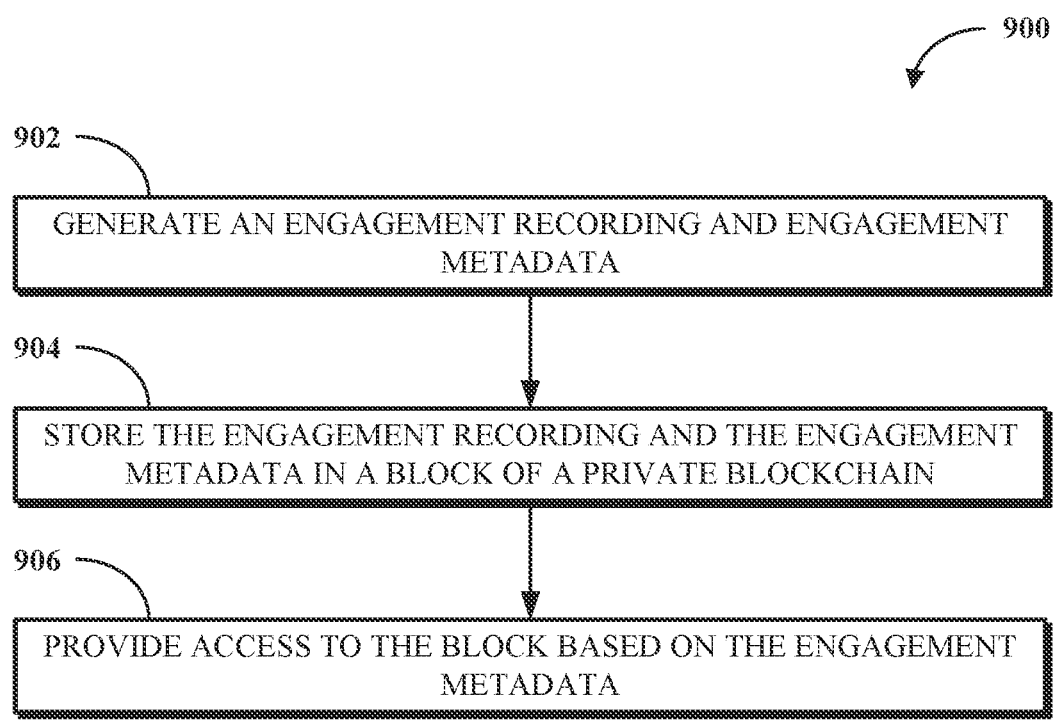
FIG. 9 is a flowchart of an example of a technique for generating and accessing a blockchain for contact center engagement data.

To further describe some implementations in greater detail, reference is next made to examples of techniques which may be performed by or using a blockchain for contact center engagement data. FIG. 7 is a flowchart of an example of a technique 700 for processing an access request. FIG. 8 is a flowchart of an example of a technique 800 for processing a block modification request. FIG. 9 is a flowchart of an example of a technique 900 for generating and accessing a blockchain for contact center engagement data. The techniques 700, 800, and/or 900 can be executed using computing devices, such as the systems, hardware, and software described with respect to FIGS. 1-6. The techniques 700, 800, and/or 900 can be performed, for example, by executing a machine-readable program or other computer-executable instructions, such as routines, instructions, programs, or other code. The steps, or operations, of the techniques 700, 800, 900 or another technique, method, process, or algorithm described in connection with the implementations disclosed herein can be implemented directly in hardware, firmware, software executed by hardware, circuitry, or a combination thereof.

For simplicity of explanation, the techniques, 700, 800, and 900 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 illustrates an example of the technique 700 for processing the access request. The access request is for accessing data in a block (e.g., one of the blocks 514A-D or the block 600) of a blockchain (e.g., the blockchain 512).

At 702, a computer receives the access request. The access request identifies a source device that transmitted the access request. The computer may be one of the nodes of decentralized storage (e.g., the decentralized storage 510) storing the blockchain or a computer coupled to the decentralized storage (e.g., the contact center server 506 or one of the business servers 508A-B).

At 704, the computer determines whether the source device is on an access list (e.g., the access list 620) of the block to be accessed. The access list identifies one or more devices that have access to the block. The one or more devices may be identified by at least one of a device identifier, an account identifier, a server identifier (e.g., an identifier of the business server 508A for user devices accessing via the business server 508A), or a set of account identifiers (e.g., all accounts associated with email addresses in the format *@example.com, where * is a string, a substring or a set of characters, and example.com is associated with a business identified in the access list). If the source device is on the access list, the technique 700 continues to 706. If the source device is not on the access list, the technique 700 continues to 708.

At 706, in response to determining that the source device is on the access list, the computer grants the access request. Granting the access request may include transmitting the requested data from the block to the source device. The requested data may be displayed, further transmitted, or otherwise processed by the source device.

At 708, in response to determining that the source device is not on the access list, the computer denies the access request. Denying the access request may include transmitting, to the source device, a message indicating that the access request was denied.

FIG. 8 illustrates an example of the technique 800 for processing a block modification request. The block modification request is for modifying a block (e.g., one of the blocks 514A-D or the block 600) of a blockchain (e.g., the blockchain 512).

At 802, a computer receives a block modification request from a source device. The block modification request identifies a block of the blockchain and a modification for the block. The modification may include deleting the entire block or deleting or updating part of the content of the block. The source device is a device that transmits the block modification request. The computer may be one of the nodes of decentralized storage (e.g., the decentralized storage 510) storing the blockchain or a computer coupled to the decentralized storage (e.g., the contact center server 506 or one of the business servers 508A-B).

At 804, the computer determines whether members of a set of entities approve of the block modification request. The set of entities corresponds to the entities associated with the entity signatures (e.g., the entity signatures 622A-B) in the Merkle root (e.g., the Merkle root 606) of the block. In some cases, one or more members the set of entities may automatically provide approval (e.g., to comply with legal or best practice requirements) if the request is received from a predetermined set of devices (e.g., devices in the access list 620) or if other conditions are met (e.g., the engagement occurred more than a threshold time (e.g., three months) ago, a transaction associated with the engagement closed or conclusively failed to close, or the request is to delete data and not to add new data). The automatic approval may be provided by a server of the entity in response to a request for the approval transmitted from the computer. In some cases, one or more members of the set of entities may transmit the request to a user device of an employee of (or other person associated with) the entity for manual approval by the employee. If the members of the set of entities approve of the block modification request, the technique 800 continues to 806. If the members of the set of entities do not approve of the block modification request, the technique 800 continues to 808. In some cases, if no response is provided by one of the members during a threshold time period, (e.g., 48 hours or two business days) the technique 800 continues to 808 as no approval was provided by the one of the members.

At 806, upon determining that the members of the set of entities approve of the block modification request, the computer modifies the block per the block modification request. The computer transmits a message to the source device indicating that the block was modified.

At 808, upon determining that the members of the set of entities do not approve of the block modification request, the computer denies the block modification request. The computer transmits a message to the source device indicating the modification request is denied. The message may include an indication of the members of the set of entities that did not provide their approval. The user of the source device may then proceed to contact those entities (e.g., via the contact center) to obtain their approval for the modification request.

FIG. 9 is a flowchart of an example of the technique 900 for generating and accessing a blockchain for contact center engagement data. The technique 900 may be performed by a server (e.g., the contact center server 506) of a contact center (e.g., the contact center 400).

At 902, the server generates an engagement recording and engagement metadata associated with a contact center engagement. The engagement recording may be generated during a contact center engagement between a user device (e.g., the user device 502) and an agent device (e.g., the agent device 504). The engagement metadata identifies, among other things, user devices or business servers permitted to access the recording. The one or more business servers may correspond to one or more businesses associated with the engagement. The user devices may correspond to one or more users participating in the engagement or whose accounts are discussed in the engagement. The engagement metadata may also identify business servers or devices to sign (e.g., using a digital signature) the recording. The servers and devices signing the recording may correspond to a subset of the devices and servers permitted to access the recording.

At 904, the server stores the engagement recording and the engagement metadata in a block of a private blockchain. The block includes, among other things, a hash (e.g., the previous block hash 610) of a previous block in the private blockchain, the engagement recording, and the engagement metadata. In some cases, the server removes personally identifiable information from the engagement recording and from the engagement metadata prior to storing the engagement recording and the engagement metadata in the block.

At 906, the server provides access to the block to the one or more devices and/or to the one or more business servers identified in the engagement metadata. Providing access to the block may include providing read access as described in conjunction with FIG. 7 or providing write/modification access as described in conjunction with FIG. 8.

In some implementations, the server receives, from one of the user devices a request to delete at least a portion of the engagement recording. The server processes the deletion request as described in conjunction with the technique 800 of FIG. 8. The server deletes a portion of the engagement recording from the block in the private blockchain based on the request.

In some implementations, a digital signature is added to the block using a private key of at least one of the business servers or at least one of the user devices. The digital signature may be verified using a public key corresponding to the private key. As a result of the use of the digital signature, the at least one of the business servers or the at least one of the user devices affirms that the data in the block is accurate.

In one example use case, a user named Alan initiates a video contact center engagement with Bank B to discuss a charge to his credit card. The video contact center engagement is handled by an agent named Cindy, who works for Agency D, which provides customer service agents to Bank B. Before the engagement begins, Alan is notified that the engagement will be recorded and Alan provides consent for the recording and storage of the engagement, including the audio and visual data generated by the microphone and the camera of Alan's user device during the engagement. Based on the receipt of Alan's consent, the video contact center engagement is recorded. During the video contact center engagement, Cindy flags times (e.g., by selecting an icon on her screen) when she is verifying Alan's personally identifiable information (e.g., credit card number or identity documents) to ensure that those times are not stored in the recording. Alternatively, the personally identifiable information may be removed using machine learning technology (e.g., an engine trained using supervised learning). After the contact center engagement is completed and the personally identifiable information is removed, the engagement recording is stored in a block of a private blockchain in decentralized storage. Engagement metadata—including Alan's name, Cindy's name, the identifiers of Bank B and Agency D, and Cindy's notes about the engagement—are also stored in the block. The block is digitally signed by a server of Bank B and by a server of Agency D.

If a computer attempts to access the block in the blockchain to review the engagement recording or the engagement metadata, a server associated with the blockchain verifies that the computer has read access to the block. Read access may be granted to computers associated with Alan's user account at Bank B, as well as computers of employees of Bank B (e.g., accessing the blockchain via a server of Bank B) and computers of employees of Agency D (e.g., accessing the blockchain via a server of Agency D). Read access may be denied to other computers. As a result, Alan may be able to view the engagement recording, as well as employees of Bank B and employees of Agency D. However, Eve's user device, which is not associated with Alan, Bank B or Agency D, would not be granted read access to the block in the blockchain or any information contained therein.

At a later time, Alan accesses the contact center and requests to remove the video imagery of himself from the engagement recording, while maintaining the audio recording of himself and the video imagery of Cindy. The request is transmitted to the server of Bank B and the server of Agency D for approval. The server of Agency D automatically provides its approval. At Bank B, the request is forwarded to a device of a compliance agent of Bank B. The compliance agent reviews the engagement recording and Cindy's notes in the engagement metadata and provides approval for removing the video imagery of Alan. The approval is transmitted to the server of Bank B and then to the decentralized storage. In response to receiving the approval of the server of Bank B and the server of Agency D, the block is modified to remove the video imagery of Alan (e.g., by replacing the video imagery of Alan with a blank screen or by replacing the video recording with an audio recording). The modified block is, once again, signed by the server of Bank B and by the server of Agency D.

Some implementations are described below as numbered examples (Example 1, 2, 3, etc.). These examples are provided as examples only and do not limit the other implementations disclosed herein.

Example 1 is a method, comprising: generating, by a server of a contact center, an engagement recording and engagement metadata associated with a contact center engagement, the engagement metadata identifying one or more user devices and one or more business servers; storing the engagement recording and the engagement metadata in a block of a private blockchain, the block comprising a cryptographic hash of a previous block in the private blockchain, the engagement recording, and the engagement metadata; and providing access to the block to the one or more user devices or the one or more business servers.

In Example 2, the subject matter of Example 1 includes, denying access to the block to a user device that is not associated with the one or more user devices and that is not accessing the block via the one or more business servers.

In Example 3, the subject matter of Examples 1-2 includes, removing personally identifiable information from the engagement recording and from the engagement metadata prior to storing the engagement recording and the engagement metadata in the block.

In Example 4, the subject matter of Examples 1-3 includes, wherein the engagement metadata comprises at least one of: an engagement duration, a hold time duration, an engagement start time, an engagement end time, an identifier of a contact center agent participating in the contact center engagement, an identifier of a contact center unit associated with the contact center engagement, or a summary of the contact center engagement.

In Example 5, the subject matter of Examples 1-4 includes, wherein the one or more business servers comprise at least one of: a server of a business operating the contact center, a server of a customer service provision business, or a server of a business transacting with a user of the one or more user devices.

In Example 6, the subject matter of Examples 1-5 includes, receiving, from a device associated with the one or more user devices, a request to delete at least a portion of the engagement recording; deleting the at least the portion of the engagement recording from the blockchain based on the request.

In Example 7, the subject matter of Examples 1-6 includes, storing the private blockchain at multiple nodes of a decentralized computer network.

In Example 8, the subject matter of Examples 1-7 includes, adding a digital signature to the block using a private key of the one or more user devices or the one or more business servers, wherein the digital signature is verifiable using a public key corresponding to the private key.

Example 9 is a non-transitory computer readable medium storing instructions operable to cause one or more processors to perform operations comprising: generating, by a server of a contact center, an engagement recording and engagement metadata associated with a contact center engagement, the engagement metadata identifying one or more user devices and one or more business servers; storing the engagement recording and the engagement metadata in a block of a private blockchain, the block comprising a cryptographic hash of a previous block in the private blockchain, the engagement recording, and the engagement metadata; and providing access to the block to the one or more user devices or the one or more business servers.

In Example 10, the subject matter of Example 9 includes, the operations comprising: forgoing granting access to the block to a user device that is not associated with the one or more user devices and that is not accessing the block via the one or more business servers.

In Example 11, the subject matter of Examples 9-10 includes, the operations comprising: removing personally identifiable information from the engagement recording prior to storing the engagement recording in the block.

In Example 12, the subject matter of Examples 9-11 includes, wherein the engagement metadata comprises at least one of: an engagement duration, an engagement start time, an engagement end time, an identifier of a contact center agent participating in the contact center engagement, an identifier of a contact center unit associated with the contact center engagement, or a summary of the contact center engagement.

In Example 13, the subject matter of Examples 9-12 includes, wherein the one or more business servers comprise at least one of: a server of a business operating the contact center or a server of a business transacting with a user of the one or more user devices.

In Example 14, the subject matter of Examples 9-13 includes, the operations comprising: receiving, from a device associated with the one or more user devices, a request to delete a portion of the engagement recording; deleting the portion of the engagement recording from the blockchain based on the request.

In Example 15, the subject matter of Examples 9-14 includes, the operations comprising: storing the private blockchain at nodes of a decentralized computer network.

In Example 16, the subject matter of Examples 9-15 includes, the operations comprising: digitally signing, with a digital signature, the block using a private key of the one or more user devices or the one or more business servers, wherein the digital signature is verifiable using a public key corresponding to the private key.

Example 17 is a system, comprising: a memory subsystem; and processing circuitry configured to execute instructions stored in the memory subsystem to: generate, by a server of a contact center, an engagement recording and engagement metadata associated with a contact center engagement, the engagement metadata identifying one or more user devices and one or more business servers; store the engagement recording and the engagement metadata in a block of a private blockchain, the block comprising a cryptographic hash of a previous block in the private blockchain, the engagement recording, and the engagement metadata; and provide access to the block to the one or more user devices or the one or more business servers.

In Example 18, the subject matter of Example 17 includes, the processing circuitry configured to execute the instructions stored in the memory subsystem to: deny access to the block to a user device that is not one of the one or more user devices and that is not accessing the block via the one or more business servers.

In Example 19, the subject matter of Examples 17-18 includes, the processing circuitry configured to execute the instructions stored in the memory subsystem to: identify, within the engagement recording and within the engagement metadata, personally identifiable information; remove the identified personally identifiable information from the engagement recording and from the engagement metadata prior to storing the engagement recording and the engagement metadata in the block.

In Example 20, the subject matter of Examples 17-19 includes, wherein the engagement metadata comprises at least one of: an engagement duration, a hold time duration, an engagement start time, an identifier of a contact center agent participating in the contact center engagement, an identifier of a contact center unit associated with the contact center engagement, or a summary of the contact center engagement.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    generating, by a server of a contact center, an engagement recording and engagement metadata associated with a contact center engagement, the engagement metadata identifying one or more user devices and one or more business servers, wherein the one or more business servers comprise a server of a business operating the contact center;
    storing the engagement recording and the engagement metadata in a block of a private blockchain, the block comprising a cryptographic hash of a previous block in the private blockchain, the engagement recording, and the engagement metadata; and
    providing access to the block to the one or more user devices or the one or more business servers.

2. The method of claim 1, comprising:
    denying access to the block to a user device that is not identified in the engagement metadata as one the one or more user devices and that is not accessing the block via the one or more business servers.

3. The method of claim 1, comprising:
    removing personally identifiable information from the engagement recording and from the engagement metadata prior to storing the engagement recording and the engagement metadata in the block.

4. The method of claim 1, wherein the engagement metadata comprises at least one of: an engagement duration, a hold time duration, an engagement start time, an engagement end time, an identifier of a contact center agent participating in the contact center engagement, an identifier of a contact center unit associated with the contact center engagement, or a summary of the contact center engagement.

5. The method of claim 1, wherein the one or more business servers further comprise at least one of: a server of a customer service provision business, or a server of a business transacting with a user of the one or more user devices.

6. The method of claim 1, comprising:
    receiving, from a device associated with the one or more user devices, a request to delete at least a portion of the engagement recording; and
    deleting the at least the portion of the engagement recording from the blockchain based on the request.

7. The method of claim 1, comprising:
    storing the private blockchain at multiple nodes of a decentralized computer network.

8. The method of claim 1, comprising:
    adding a digital signature to the block using a private key of the one or more user devices or the one or more business servers, wherein the digital signature is verifiable using a public key corresponding to the private key.

9. A non-transitory computer readable medium storing instructions operable to cause one or more processors to perform operations comprising:
    generating, by a server of a contact center, an engagement recording and engagement metadata associated with a contact center engagement, the engagement metadata identifying one or more user devices and one or more business servers, wherein the one or more business servers comprise a server of a business operating the contact center;
    storing the engagement recording and the engagement metadata in a block of a private blockchain, the block comprising a cryptographic hash of a previous block in the private blockchain, the engagement recording, and the engagement metadata; and
    providing access to the block to the one or more user devices or the one or more business servers.

10. The non-transitory computer readable medium of claim 9, the operations comprising:
    forgoing granting access to the block to a user device that is not identified in the engagement metadata as one the one or more user devices and that is not accessing the block via the one or more business servers.

11. The non-transitory computer readable medium of claim 9, the operations comprising:
    removing personally identifiable information from the engagement recording prior to storing the engagement recording in the block.

12. The non-transitory computer readable medium of claim 9, wherein the engagement metadata comprises at least one of: an engagement duration, an engagement start time, an engagement end time, an identifier of a contact center agent participating in the contact center engagement, an identifier of a contact center unit associated with the contact center engagement, or a summary of the contact center engagement.

13. The non-transitory computer readable medium of claim 9, wherein the one or more business servers comprise at least one of: a server of a business operating the contact center or a server of a business transacting with a user of the one or more user devices.

14. The non-transitory computer readable medium of claim 9, the operations comprising:
    receiving, from a device associated with the one or more user devices, a request to delete a portion of the engagement recording; and
    deleting the portion of the engagement recording from the blockchain based on the request.

15. The non-transitory computer readable medium of claim 9, the operations comprising:
    storing the private blockchain at nodes of a decentralized computer network.

16. The non-transitory computer readable medium of claim 9, the operations comprising:
    digitally signing, with a digital signature, the block using a private key of the one or more user devices or the one or more business servers, wherein the digital signature is verifiable using a public key corresponding to the private key.

17. A system, comprising:
    a memory subsystem; and processing circuitry configured to execute instructions stored in the memory subsystem to:
- generate, by a server of a contact center, an engagement recording and engagement metadata associated with a contact center engagement, the engagement metadata identifying one or more user devices and one or more business servers, wherein the one or more business servers comprise a server of a business operating the contact center;
- store the engagement recording and the engagement metadata in a block of a private blockchain, the block comprising a cryptographic hash of a previous block in the private blockchain, the engagement recording, and the engagement metadata; and
- provide access to the block to the one or more user devices or the one or more business servers.

18. The system of claim 17, the processing circuitry configured to execute the instructions stored in the memory subsystem to:
- deny access to the block to a user device that is not identified in the engagement metadata as one of the one or more user devices and that is not accessing the block via the one or more business servers.

19. The system of claim 17, the processing circuitry configured to execute the instructions stored in the memory subsystem to:
- identify, within the engagement recording and within the engagement metadata, personally identifiable information; and
- remove the identified personally identifiable information from the engagement recording and from the engagement metadata prior to storing the engagement recording and the engagement metadata in the block.

20. The system of claim 17, wherein the engagement metadata comprises at least one of: an engagement duration, a hold time duration, an engagement start time, an identifier of a contact center agent participating in the contact center engagement, an identifier of a contact center unit associated with the contact center engagement, or a summary of the contact center engagement.

* * * * *